(12) United States Patent
Grüll et al.

(10) Patent No.: US 8,414,193 B2
(45) Date of Patent: Apr. 9, 2013

(54) RETAINING ELEMENT FOR A ROLLER BEARING

(75) Inventors: Robert Grüll, Sulzdorf (DE); Rut Heemskerk, Poppenhausen (DE); Stefan Pampel, Haβfurt (DE); Markus Volkmuth, Wipfeld (DE); Jürgen Reichert, Haag (DE)

(73) Assignee: Aktiebolaget SKF, Göteborg (SE)

( * ) Notice: Subject to any disclaimer, the term of this patent is extended or adjusted under 35 U.S.C. 154(b) by 365 days.

(21) Appl. No.: 12/751,716

(22) Filed: Mar. 31, 2010

(65) Prior Publication Data
US 2010/0278470 A1    Nov. 4, 2010

(51) Int. Cl.
*F16C 33/51*    (2006.01)
(52) U.S. Cl.
USPC .......................................................... 384/551
(58) Field of Classification Search ............... 384/551, 384/553, 521, 51
See application file for complete search history.

(56) References Cited

U.S. PATENT DOCUMENTS

| | | | | |
|---|---|---|---|---|
| 549,686 A | * | 11/1895 | Pitcher et al. | 384/553 |
| 3,606,504 A | * | 9/1971 | Wojciechowski | 384/551 |
| 5,597,243 A | * | 1/1997 | Kaiser et al. | 384/551 |
| 2009/0060706 A1 | | 3/2009 | Habibvand | |

FOREIGN PATENT DOCUMENTS

| | | |
|---|---|---|
| DE | 9301764 U1 | 3/1993 |
| DE | 4236847 A1 | 5/1994 |
| DE | 10101054 A1 | 7/2001 |
| DE | 10164867 B4 | 2/2006 |
| EP | 1921333 A1 | 5/2008 |
| FR | 1104502 A | 11/1955 |
| JP | 2003222140 A | 8/2003 |
| JP | 2007232186 A | 9/2007 |
| JP | 2008064248 A | 3/2008 |

\* cited by examiner

*Primary Examiner* — Thomas R Hannon
(74) *Attorney, Agent, or Firm* — Mark A. Ussai; Bryan Peckjian

(57) ABSTRACT

A retaining element is disposed between two adjacent roller bodies of a roller bearing having an inner ring and an outer ring. The inner ring has an inner ring track with an inner radius and the outer ring has an outer ring track with an outer radius. Center points of the roller bodies are disposed along a pitch circle having a pitch circle radius. The retaining element extends radially inward from the pitch circle over at least 90% of the difference between the pitch circle radius and the inner radius and extends radially outward from the pitch circle over up to 50% of the difference between the outer radius and the pitch circle radius or vice versa.

18 Claims, 4 Drawing Sheets

RETAINING ELEMENT FOR A ROLLER BEARING

CROSS-REFERENCE

This application claims priority to German patent application no. 10 2009 016 017.5, filed Apr. 2, 2009, which is incorporated by reference herein in its entirety.

TECHNICAL FIELD

The invention generally relates to a retaining element that may be disposed, e.g., between two adjacent roller bodies of a roller bearing.

KNOWN ART

Roller bearings are known, e.g., from DE 101 01 054 B4 and DE 101 64 867 B4 and their English counterpart U.S. Pat. No. 6,565,947. Unlike traditional roller bearings that utilize cages to maintain the position of the roller bodies in the roller bearing, the roller bodies of these patents are guided in the roller bearing by retaining elements that are inserted between the individual roller bodies in the circumferential direction.

However, the design of the retaining elements and in particular the surfaces that are in sliding contact with parts of the bearing during operation, must ensure that the internal bearing friction is minimal and optimal lubricating relationships are maintained. The retaining elements should thus prevent direct contact between the roller bodies and should not contact the inner and outer races during operation.

In this regard, the previously-known retaining elements exhibit, at least to some extent, unsatisfactory properties.

SUMMARY

In one aspect of the present teachings, a retaining element for a roller bearing is taught that exhibits improved properties during operation. For example, in certain embodiments, the lubricating conditions in the roller bearing can be improved so that a low-friction operation can be ensured.

In addition or in the alternative, the retaining elements may be configured to prevent direct contact between adjacent roller bodies, preferably cylindrical roller bodies, while also avoiding contact with the inner and outer rings of the rolling bearing during operation.

In addition or in the alternative, the shape of the surfaces of the retaining element configured to abut or contact the roller bodies may be designed to minimize friction during operation.

In another aspect of the present teachings, the retaining element for the roller bearing preferably extends radially inwardly, when positioned for its intended use, from a pitch circle defined by the middle or center points of the roller bodies over at least about 90% of the difference between the pitch circle radius and the inner radius of the inner ring of the roller bearing and also extends radially outwardly from the pitch circle over at most about 50%, more preferably over at most about 25%, of the difference between the outer radius of the outer ring of the roller bearing and the pitch circle radius.

Preferably, the retaining element extends inwardly, during its intended use, from the pitch circle over about 100% of the difference between the pitch circle radius and the inner radius. In the resting state or standstill condition of such an embodiment, the retaining element can abut on the inner ring track and can thus be supported on the inner ring track.

The retaining element preferably has concave circular arc-shaped abutment surfaces for contacting the roller bodies on its sides facing the roller bodies. The abutment surfaces preferably have a slightly larger radius of curvature than the radius of the roller bodies. For example, the radius of curvature of the abutment surfaces may advantageously correspond to about 110% to 125% of the radius of the roller bodies.

At least one opening may be defined in the concave circular arc-shaped abutment surfaces. In such an embodiment, lubricant (e.g., grease) can collect in the opening(s) during operation of the roller bearing and thus improve the lubrication conditions of the roller bearing. This opening preferably has—as viewed in the direction of the circumference of the roller bearing—a rectangular-shaped form.

In another aspect of the present teachings, the retaining element may have, at least partially, a concave shape in a portion or surface that faces the inner ring track. The concave shape preferably has a radius of curvature that is slightly smaller or less than the inner radius of the inner ring track.

In addition or in the alternative, at least one cavity may be formed in the area defined by the concave shape for retaining lubricant during operation of the roller bearing. Such a cavity preferably has, as observed in the radial direction, a rectangular shape.

In another aspect of the present teachings, the retaining element can be designed with segments at each axial end that are each formed so as to abut or contact the roller bodies. A middle portion (as viewed in the axial direction of the roller bearing) may connect these axial end segments and may have a shape that is at least partially set back and/or recessed relative to the surface of the roller bodies, i.e. there is a clearance between the surface of the roller bodies and at least one innermost surface of the middle portion of the retaining element. The middle portion is preferably formed as a bridge, more preferably with a constant thickness, which connects the two axial end segments with each other. In addition or in the alternative, the bridge can include a segment defined over at least a portion of the height of the retaining element in the radial direction, preferably at most over half of its radial height, which is formed for abutment or contact with the roller bodies.

It is advantageous to give the middle portion a curved form or shape as viewed in the direction of the circumference of the roller bearing. More preferably, the middle portion may include a portion facing towards the inner ring that is defined as an arch, more preferably as a circular arc.

The retaining element preferably comprises or is comprised of one or more plastic material, such as polyamide (PA), polyether ether ketone (PEEK) and/or polyphthalamide (PPA). Reinforcement elements, such as glass beads and/or glass fibers, can be introduced or embedded into the plastic material. In addition or in the alternative, polytetrafluoroethylene (PTFE) and/or graphite can be introduced into the plastic material.

The retaining element is preferably produced by injection molding and is formed in one-piece. However, it is also possible to produce the retaining element, e.g., by milling.

The above described retaining elements are preferably utilized in a cylindrical roller bearing which preferably includes a plurality of cylindrical roller bodies disposed between an inner race and an outer race.

In one or more embodiments of the retaining element taught herein, a favorable friction behavior may be achieved so that the bearing can be operated in a low friction manner. The present retaining elements can also be designed to prevent direct contact between the roller bodies, thereby reducing the risk of adhesion or damage to the roller bodies. The individual roller bodies are thereby efficiently and effectively separated.

In preferred embodiments, the retaining elements may lie loosely between the roller bodies of the bearing and may be roller centered or roller guided. During operation of the bearing in the usual manner, no contact of the retaining element with the inner or outer tracks of the bearing rings occurs. On the other hand, when the bearing is resting or in an idle state (i.e. not moving), the retaining elements may contact and be supported on the inner ring track. Rims may be provided on both sides for axial guidance.

Exemplary embodiments of the present teaching will now be described in more detail with the assistance of the appended drawings.

DETAILED DESCRIPTION OF THE PREFERRED EMBODIMENTS

Each of the additional features and teachings disclosed below may be utilized separately or in conjunction with other features and teachings to provide improved roller bearings and/or retaining elements therefor, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
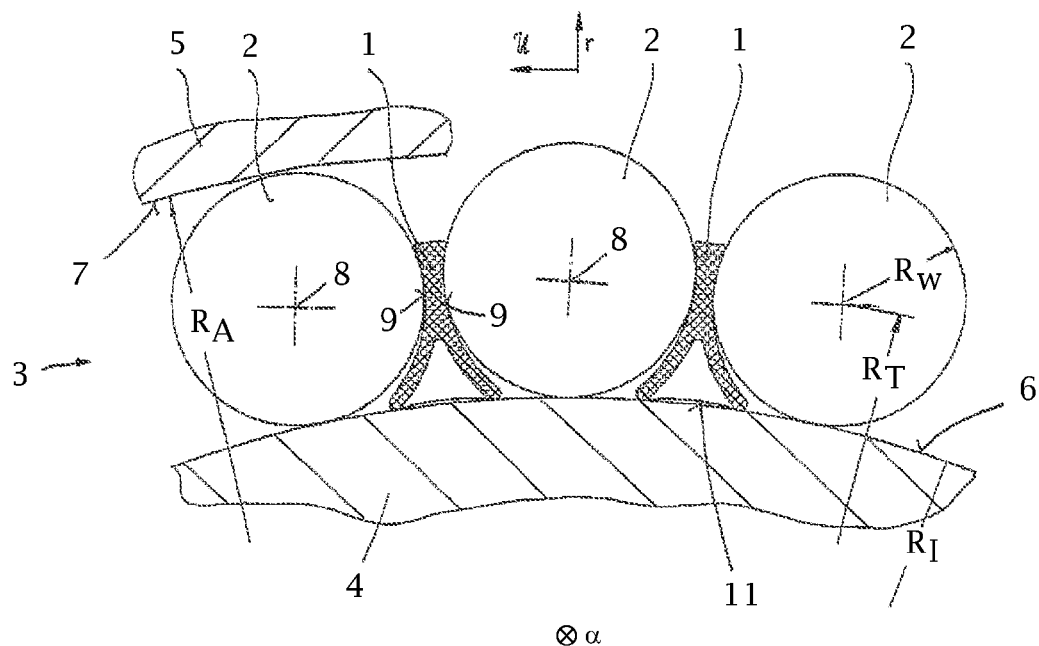
FIG. 1 shows a section through a part of a representative cylindrical roller bearing, wherein the section extends perpendicular to the axis a of the roller bearing.

In FIG. 1, a roller bearing 3, which is preferably a cylindrical roller bearing, is illustrated in a cross-sectional manner. The roller bearing 3 includes an inner ring or race 4 having an inner ring track 6 and an outer ring or race 5 having an outer ring track 7. A plurality of roller bodies 2, e.g., cylindrical rollers each having a roller radius $R_W$, is disposed between the bearing rings 4, 5. The roller bodies 2 are not guided relative to each other by means of a cage, as in conventional roller bearings, but rather by a plurality of separate or discrete retaining elements 1 that are fitted in the bearing 3 corresponding to the number of roller bodies 2, i.e. the roller bearing 3 has an equal number of roller bodies 2 and retaining elements 1. Further, one retaining element 1 is disposed between each two roller bodies 2.

The outer ring track 7 has an outer radius $R_A$ and the inner ring track 6 has an inner radius $R_I$. The middle or center points 8 of the roller bodies 2 move along a pitch circle having a pitch circle radius $R_T$. It is noted for clarity purposes that the outer radius $R_A$ is measured from the radially inward-facing surface of the outer ring 5 to the rotational axis of the roller bearing 3 and the inner radius $R_I$ is measured from the radially-outward facing surface of the inner ring 4 to the rotational axis of the roller bearing 3.

The retaining elements 1 preferably have concave circular arc-shaped abutment surfaces 9 for guiding the roller bodies 2.

More preferably, the retaining element 1 is designed such that, when positioned for its intended use, it extends radially inward (in direction r) from the pitch circle defined by the center points 8 of the roller bodies 2 over at least 90% of the difference $R_T-R_I$ between the pitch circle radius $R_T$ and the inner radius $R_I$. More preferably, the retaining element 1 extends in the radial direction over about 100% of the difference $R_T-R_I$, i.e. the retaining element 1 may extend from the pitch circle of the roller bearings 2 to the surface of the inner ring track 6. In addition, the retaining element 1 preferably extends radially outward from the pitch circle over at most 50% of the difference $R_A-R_T$ between the outer radius $R_A$ and the pitch circle radius $R_T$, more preferably less than 25% of the difference $R_A-R_T$. Thus, in this particular embodiment of the present teachings, the retaining element 1 has an approximately triangular-shaped cross-section—as is apparent from FIG. 1—and preferably extends radially outward only slightly beyond or past the pitch circle.

In preferred embodiments, the retaining element 1 does not contact the inner ring track 6 during operation, but rather provides a pure rolling guidance of the roller bodies 2. In the resting state of the bearing, however, the retaining element 1 may contact the inner ring track 6. In such an embodiment, the side of the retaining element 1 that faces the inner ring track 6 may have a concave shape 11. More preferably, the concave shape 11 may be curved somewhat more sharply (i.e. have a small radius of curvature) than the inner ring track 6 or the inner radius $R_I$.

Figure 2:
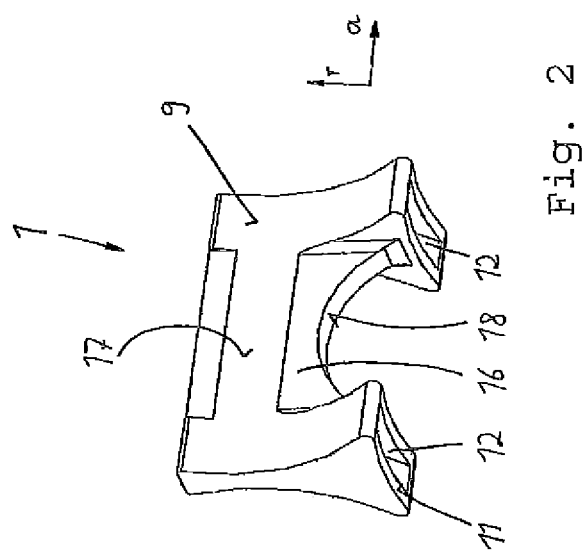
FIG. 2 shows a perspective illustration of a retaining element according to a first representative embodiment of the present teaching, which may be disposed between two (not illustrated) roller bodies of the bearing of FIG. 1.
Figure 5:
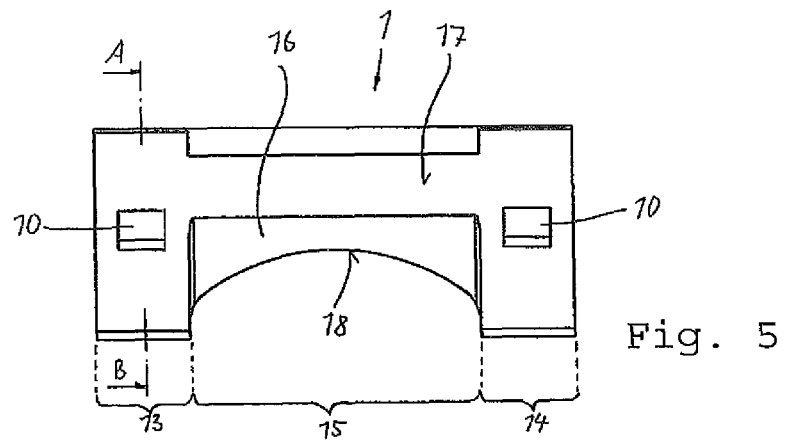
FIG. 5 shows the retaining element of FIGS. 3 and 4 in a front view, as viewed in the circumferential direction of the bearing.
Figure 6:
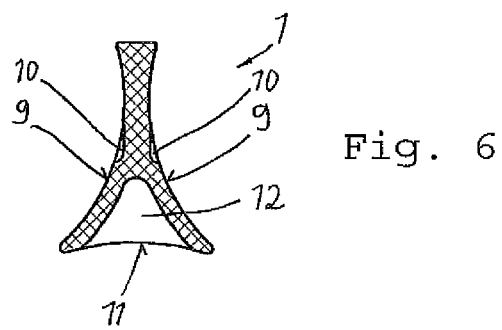
FIG. 6 shows the retaining element of FIGS. 3 and 4 in a side view along the line A-B shown in FIG. 5.
Figure 7:
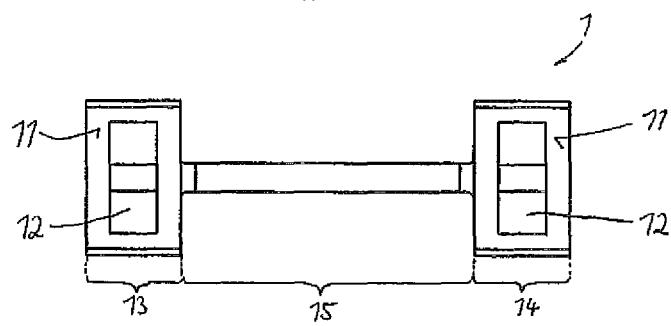
FIG. 7 shows the retaining element of FIGS. 3 and 4 in the view from below.

The retaining element 1 is illustrated in more detail in FIG. 2, which shows a retaining element 1 having a three-part construction, i.e. a construction that is comprised of three segments 13-15, which are also shown in FIG. 5 and FIG. 7. That is, the retaining element 2 includes segments 13 and 14 at its axial end portions that are connected with each other via a middle portion 15.

The segments 13 and 14 preferably provide concave abutment surfaces 9 for the roller bodies 2 over the entire height of the segments 13 and 14 in the radial direction. The middle portion 15, on the other hand, preferably has only one segment 17 with a concave abutment surface. In the remaining portions of the middle portion 15, the material of the retaining element 1 is recessed or set back relative to the concave abutment surfaces 9 so that the remaining portion(s) of the middle portion 15 do(es) not contact the roller bodies 2.

By reducing the amount of material in the middle portion, the weight of the retaining element 1 can be reduced.

A light construction as well as an optimal lubrication of the bearing is facilitated when the middle portion 15 is at least partially embodied as a bridge 16 that preferably has a constant thickness in the circumferential direction U. Further, the bridge 16 may have a curved form 18, which can be circular arc-shaped, for weight reduction as well as in order to enable the storage of adequate lubricant during operation.

As can be further seen in FIG. 2, cavities 12 may be defined in the area of the concave shape 11 facing the inner ring track 6. Such cavities 12 advantageously permit lubricant to collect there and to be available for lubricating the retaining element 1 relative to the inner ring track 6 during operation.

A similar form of the retaining element 1 is derivable from the FIGS. 3 to 7.

Openings 10 may be defined in the concave abutment surfaces 9 and—like the cavities 12—may permit lubricant to collect therein during operation, so that the lubricant is available for lubricating the roller bodies 2 contacting the abutment surfaces 9.

As to the rest, the conceptual structure corresponds to that of FIG. 2. However, the curved form 18 of the embodiment of FIGS. 3 and 4 is somewhat flatter (e.g., has a larger radius of curvature) than in FIG. 2.

Figure 8:
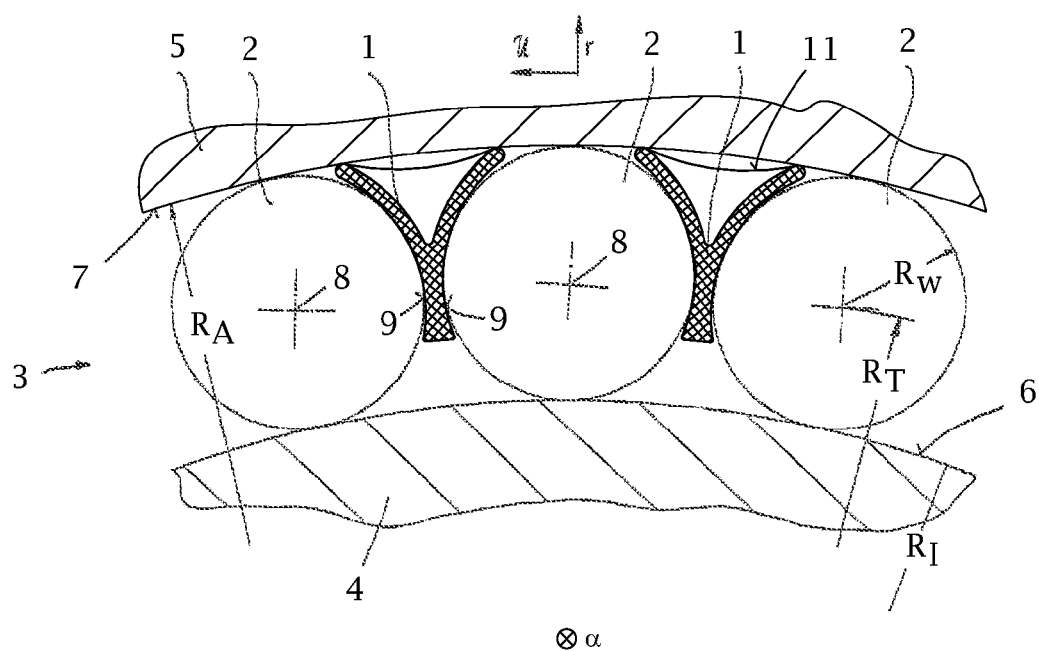
FIG. 8 shows a section through a part of an alternate embodiment of a cylindrical roller bearing, wherein the section extends perpendicular to the axis (a) of the roller bearing.

In principle, the retaining element 1 can be also designed to be guided on the outer ring 5 of the bearing 3, instead of being guided on the inner ring 4 via the concave shape 11 as shown in FIG. 8. In such an embodiment, the above-described structure is mirrored about the pitch circle, i.e. the retaining element 1 radially extends (substantially) completely over the portion between the pitch circle and the outer ring track and only over a maximum of 50%, preferably over about 33%, of the extension or distance between the pitch circle and the inner ring track.

Figure 3:
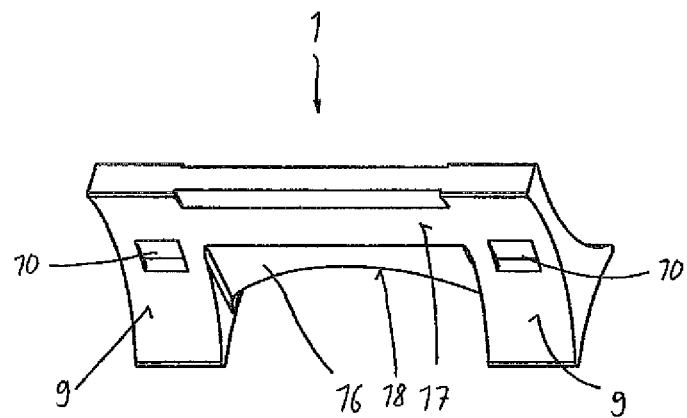
FIG. 3 shows a perspective illustration of a retaining element according to a second representative embodiment of the present teachings, which may be disposed between two (not illustrated) roller bodies of the bearing of FIG. 1.
Figure 4:
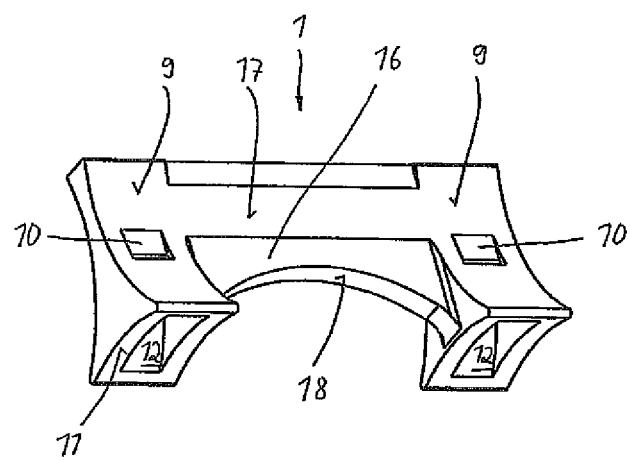
FIG. 4 shows the retaining element of FIG. 3 in perspective illustration, as viewed from another direction.

For example, the retaining elements 1 of FIGS. 2-4 may simply be inverted in operation, such that the V-shape extends radially outwardly instead of radially inwardly.

Thus, the present retaining elements can be provided for guidance on the outer track as well as on the inner track.

REFERENCE NUMBER LIST

1 Retaining element
2 Roller bodies (e.g., cylindrical rollers)
3 Roller bearing (e.g., cylindrical roller bearing)
4 Inner ring or race
5 Outer ring or race
6 Inner ring track
7 Outer ring track
8 Center point of the roller body
9 Concave circular arc-shaped abutment surface
10 Opening
11 Concave shape
12 Cavity
13 Segment
14 Segment
15 Middle portion
16 Bridge
17 Segment
18 Curved form
$R_I$ Inner radius
$R_A$ Outer radius
$R_T$ Pitch circle radius
$R_W$ Radius of the roller body
a Axial direction
r Radial direction
U Circumferential direction

The invention claimed is:

1. A roller bearing, comprising:
an inner ring having an inner ring track with an inner radius ($R_I$),
an outer ring having an outer ring track with an outer radius ($R_A$),
a plurality of cylindrical roller bodies disposed between the inner ring and the outer ring, wherein center points of the respective roller bodies are disposed along a pitch circle having a pitch circle radius ($R_T$), and
a plurality of discrete retaining elements, wherein one retaining element is disposed between two adjacent roller bodies, each retaining element satisfying the following conditions:
each retaining element extends radially inward from the pitch circle over at least 90% of the difference ($R_T$–$R_I$) between the pitch circle radius ($R_T$) and the inner radius ($R_I$) and extends radially outward from the pitch circle over less than or equal to 50% of the difference ($R_A$–$R_T$) between the outer radius ($R_A$) and the pitch circle radius ($R_T$),
wherein each retaining element is configured such that it extends radially inward from the pitch circle a distance that is approximately 100% of the difference ($R_T$–$R_I$) between the pitch circle radius ($R_T$) and the inner radius ($R_I$).

2. A roller bearing according to claim 1, wherein each retaining element is configured such that it extends radially outward from the pitch circle over less than or equal to 25% of the difference ($R_A$–$R_T$) between the outer radius ($R_A$) and the pitch circle radius (RT).

3. A roller bearing according to claim 1, wherein opposite sides of each retaining element configured to face the respective roller bodies have concave circular arc-shaped surfaces for abutting the roller bodies, the circular arc-shaped abutment surfaces having a larger radius of curvature than the radius of the roller bodies.

4. A roller bearing according to claim 3, wherein the radius of curvature of the abutment surfaces is 110% to 125% of the radius of the roller bodies.

5. A roller bearing according to claim 4, further comprising at least one opening defined in the abutment surfaces.

6. A roller bearing according to claim 1, wherein at least a portion of the retaining element that is configured to face the inner ring track has a concave shape.

7. A roller bearing according to claim 6, wherein the concave shape has a radius of curvature that is smaller than the inner radius ($R_I$) of the inner ring track.

8. A roller bearing according to claim 7, further comprising at least one cavity defined within the concave shape and opening towards the inner ring track.

9. A roller bearing according to claim 1, wherein segments are defined at each axial end of the retaining element for abutment against the roller bodies and a bridge segment connects the axial end segments, wherein at least a portion of the bridge segment is recessed relative to surfaces of the roller bodies and does not contact the roller bodies.

10. A roller bearing according to claim 9, wherein the bridge segment includes a concave surface configured for abutting one adjacent roller body, the surface being formed over up to one-half of the height of the bridge segment in the radial direction of the roller bearing.

11. A roller bearing according to claim 10, wherein a radially-inwardly-facing surface of the bridge segment has a circular arc shape in the axial direction of the roller bearing.

12. A roller bearing according to claim 1, wherein the retaining element is comprised of at least one plastic selected from the group consisting of polyamide (PA), polyether ether ketone (PEEK) and polyphthalamide (PPA).

13. A roller bearing according to claim 12, wherein the plastic comprises reinforcement elements.

14. A roller bearing according to claim 13, wherein the reinforcement elements are selected from glass beads and glass fibers.

15. A roller bearing according to claim 12, wherein the plastic comprises at least one of polytetrafluoroethylene (PTFE) and graphite.

16. A roller bearing according to claim 12, wherein:
each retaining element is configured such that it extends radially outward from the pitch circle over less than or equal to 33% of the difference $(R_A-R_T)$ between the outer radius $(R_A)$ and the pitch circle radius $(R_T)$,
opposite sides of each retaining element configured to face the respective roller bodies have concave circular arc-shaped surfaces for abutting the respective roller bodies, the radius of curvature of the abutment surfaces being about 110% to 125% of the radius of the roller bodies,
at least a portion of each retaining element that is configured to face the inner ring has a concave shape with a radius of curvature that is smaller than the inner radius $(R_I)$ of the inner ring track and the roller bearing further comprises:
at least one opening defined in the concave circular arc-shaped abutment surfaces, and
at least one cavity defined within an area of the concave shape that faces the inner ring track, the cavity opening towards the inner ring track.

17. A roller bearing according to claim 16, wherein:
segments are defined at each axial end of each retaining element for abutment against the roller bodies and a bridge segment connects the axial end segments, at least a portion of the bridge segment is recessed relative to surfaces of the roller bodies,
the bridge segment includes a surface configured for abutting an adjacent roller body, the surface being formed over up to one-half of the radial height of the bridge segment and
a radially-inwardly-facing surface of the bridge segment has a circular arc shape in the axial direction of the roller bearing.

18. A cylindrical roller bearing, comprising:
an inner ring having an inner ring track with an inner radius $(R_I)$,
an outer ring having an outer ring track with an outer radius $(R_A)$,
a plurality of cylindrical roller bodies disposed between the inner ring and the outer ring, wherein center points of the respective roller bodies define a pitch circle having a pitch circle radius $(R_T)$, and
a plurality of discrete retaining elements being disposed in an alternating manner with the plurality of cylindrical roller bodies around the circumferential direction of the cylindrical roller bearing, each retaining element having concave surfaces facing the respective adjacent roller bodies, the concave surfaces having a radius of curvature that is about 110% to 125% of the radius of the roller bodies, and each retaining element satisfies one of the following conditions (i) and (ii):
(i) the concave surfaces of each retaining element extend radially inward from the pitch circle over at least 90% of the difference $(R_T-R_I)$ between the pitch circle radius $(R_T)$ and the inner radius $(R_I)$ and extend radially outward from the pitch circle over less than or equal to 50% of the difference $(R_A-R_T)$ between the outer radius $(R_A)$ and the pitch circle radius $(R_T)$, or
(ii) the concave surfaces of each retaining element extend radially outward from the pitch circle over at least 90% of the difference $(R_A-R_T)$ between the outer radius $(R_A)$ and the pitch circle radius $(R_T)$ and extend radially inward from the pitch circle over less than or equal to 50% of the difference $(R_T-R_I)$ between the pitch circle radius $(R_T)$ and the inner radius (RI),
wherein the retaining elements prevent direct contact of adjacent roller bearings and the retaining elements are configured so as to avoid contact with the inner ring track and the outer ring track during operation.

* * * * *